United States Patent [19]

Langenfeld et al.

[11] Patent Number: 4,746,254

[45] Date of Patent: May 24, 1988

[54] MATERIAL HANDLING ATTACHMENT FOR A TRACTOR HAVING A MULTIPLE-POINT HITCH ASSEMBLY INCLUDING A HIGH-LIFT MECHANISM

[75] Inventors: Joseph W. Langenfeld; Neal W. Westendorf, both of Onawa, Iowa

[73] Assignee: Westendorf Mfg. Co., Inc., Onawa, Iowa

[21] Appl. No.: 907,322

[22] Filed: Sep. 15, 1986

Related U.S. Application Data

[63] Continuation-in-part of Ser. No. 814,043, Dec. 27, 1985.

[51] Int. Cl.[4] .............................................. B66C 3/02
[52] U.S. Cl. .................................... 414/703; 172/445
[58] Field of Search .............. 414/703, 699, 723, 697, 414/680, 700; 280/461 R, 461 A, 460 R, 460 A; 172/445

[56] References Cited

U.S. PATENT DOCUMENTS

| | | | |
|---|---|---|---|
| 3,468,442 | 9/1969 | Sarvela et al. | 414/703 |
| 4,024,974 | 5/1977 | Hodge | 414/699 |
| 4,324,525 | 4/1982 | Lane et al. | 414/699 |

Primary Examiner—Robert J. Spar
Assistant Examiner—Donald W. Underwood
Attorney, Agent, or Firm—Zarley, McKee, Thomte, Voorhees & Sease

[57] ABSTRACT

A material handling bucket or the like is mounted on a high-lift mechanism which is secured to the three-point hitch assembly of a tractor. The bucket is pivotally secured to the high-lift mechanism. The high-lift mechanism includes a pair of pivotal arms which are movable between upper and lower positions by means of a hydraulic cylinder. When the pivotal arms are moved to their uppermost position, the bucket is moved above the position normally possible in conventional mechanisms and the bucket is moved to its dumping position.

1 Claim, 5 Drawing Sheets

MATERIAL HANDLING ATTACHMENT FOR A TRACTOR HAVING A MULTIPLE-POINT HITCH ASSEMBLY INCLUDING A HIGH-LIFT MECHANISM

CROSS-REFERENCE TO RELATED APPLICATION

This is a continuation-in-part patent application of Ser. No. 814,043 filed Dec. 27, 1985.

BACKGROUND OF THE INVENTION

This invention relates to a material handling attachment for a tractor and more particularly to a material handling attachment for a tractor having a three-point hitch assembly with the attachment including a high-lift mechanism.

Many types of tractor loaders or front-end loaders for tractors have been previously provided. Conventional tractor loaders normally include a frame assembly secured to the tractor frame with a pair of hydraulically controlled boom arms pivotally secured to the tractor frame. A bucket, forklift, etc. is normally attached to the forward ends of the boom arms and is also hydraulically controlled. The conventional tractor loaders are normally quite large and are expensive.

Many of the tractors available today have what is known as a three-point hitch assembly secured to the rearward end thereof. The three-point hitch assemblies normally include an upper arm and a pair of lower arms with either the upper arm or the pair of lower arms being connected to some sort of mechanism such as a hydraulic cylinder or the like to cause the hitch assembly to be vertically moved with respect to the tractor. The three-point hitch assemblies normally accommodate implements such as blades, disks, plows, etc. Attempts have been made in the past to mount material handling equipment such as a loader bucket or forklift on the three-point hitch assemblies but it is believed that all of the previous attempts have utilized hydraulic cylinders pivotally connected to the buckets or forklifts to cause the pivotal movement of the material handling equipment relative to the three-point hitch assembly. The utilization of a hydraulic cylinder results in the need for quick couplers, hydraulic hoses, etc. in addition to the hydraulic cylinder itself. The addition of the couplers, hoses and cylinder adds considerably expense to the equipment and frequently results in oil leaks occurring. Additional controls are also required to cause the pivotal movement of the material handling equipment relative to the three-point hitch assembly.

The material handling attachment disclosed in the co-pending application is believed to truly represent a significant advance in the art which overcomes the shortcomings of the prior art devices described hereinabove. However, it has been found that the attachment described in the co-pending application has certain height limitations due to the fact that the three-point hitch assembly on the tractor can only raise the attachment to a certain height.

It is therefore a principal object of the invention to provide a material handling attachment for a tractor having a three-point hitch assembly.

A further object of the invention is to provide a material handling attachment for a tractor which includes self-leveling and automatic dumping features.

Still another object of the invention is to provide a material handling attachment for a tractor which has an improved cycle speed.

Yet another object of the invention is to provide a material handling attachment for a tractor which has an automatic re-set feature after the bucket has been automatically moved to its dumping position.

Still another object of the invention is to provide a material handling attachment for a tractor which is easily and quickly mounted on the three-point hitch assembly and quickly and easily removed therefrom.

Still another object of the invention is to provide a material handling attachment for a tractor including a high-lift mechanism.

Still another object of the invention is to provide an adapter for raising a three-point hitch attachment higher than it could go if it were hooked directly to the hitch.

Yet another object of the invention is to provide an adapter for achieving high lift capability with a small compact package which is positioned close to the tractor thereby providing better visibility for the operator and reducing the need for counterbalance.

Still another object of the invention is to provide an adapter for a three-point hitch which will accommodate practically all types of three-point attachments while obtaining the additional lift height advantage.

Still another object of the invention is to provide a device of the type described which is economical of manufacture and durable in use.

These and other objects will be apparent to those skilled in the art.

SUMMARY OF THE INVENTION

Figure 1:
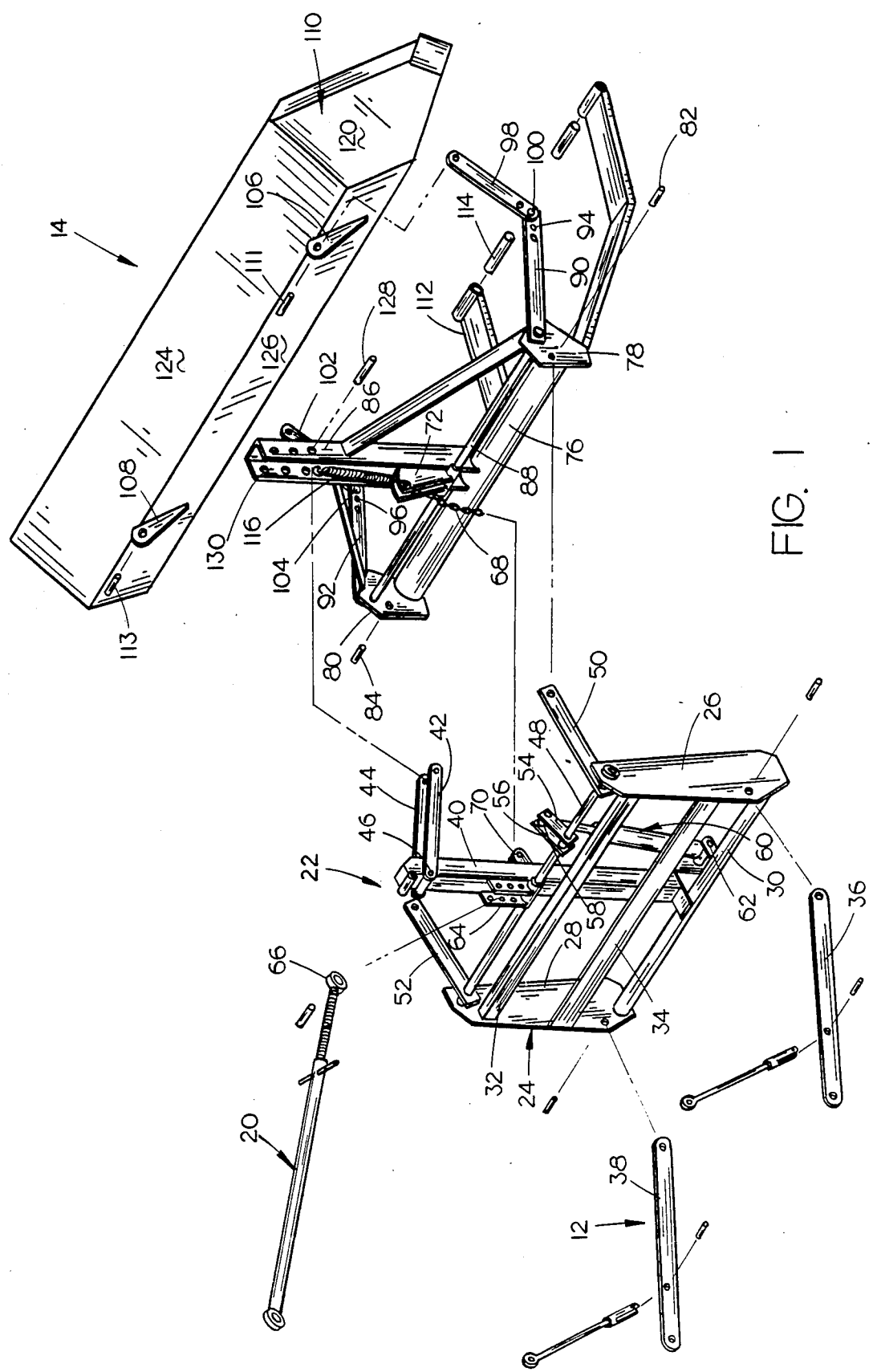
FIG. 1 is an exploded perspective view of the attachment of this invention.

A material handling attachment such as a bucket or the like is mounted on a high-lift mechanism which is secured to the three-point hitch assembly of a tractor. The three-point hitch assembly of the tractor includes a pair of lower arms and a hydraulic cylinder replacing the upper link of the hitch assembly. A material handling attachment such as a bucket or the like is pivotally secured to the high-lift mechanism. The high-lift mechanism includes a pair of pivotal arms which are movable between upper and lower positions by means of a hydraulic cylinder. When the pivotal arms are moved to their uppermost position, the bucket is automatically moved to its dumping position.

DESCRIPTION OF THE PREFERRED EMBODIMENT

Although the material handling attachment described herein is preferably a loader bucket, other attachments could be substituted therefor such as a forklift, bale spear, etc. Additionally, the three-point hitch assembly is described herein as being located on the rearward end of the tractor as is the general rule, it should be understood that the hitch assembly could also be mounted on the front end of the tractor.

The numeral 10 refers to a conventional tractor which has a vertically movable three-point hitch assembly 12 at either its forward or rearward end and which is commonly referred to as a multiple-point or three-point hitch. The bucket assembly of this invention is designated by the reference numeral 14 and is designed to be operatively secured to the three-point hitch assembly of the conventional tractor whether the three-point hitch assembly is mounted on the rearward or forward ends of the tractor. Whether the hitch assembly is mounted on the forward or rearward end of the tractor, the three-point hitch assembly includes a pair of lower link arms 16 and 18 and an upper link arm 20. The conventional tractor 10 includes means for vertically moving the hitch assembly in conventional fashion.

The numeral 22 refers generally to the high-lift mechanism which is imposed between the bucket assembly and the three-point hitch of the tractor. High-lift mechanism 22 comprises a frame means 24 including a pair of upstanding side frame members 26 and 28 having a bottom frame member 30 secured to the lower ends thereof and extending therebetween. A top frame member 32 is secured to and extends between the upper ends of side frame members 26 and 28 as seen in the drawings. An intermediate frame member 34 is secured to side frame members 26 and 28 and extends therebetween above bottom frame member 30. Side frame members 26 and 28 are pivotally connected to arms 36 and 38 of the three-point hitch assembly of the tractor. Upstanding post 40 is positioned between frame members 26 and 28 and is secured to frame members 30, 34 and 32 by welding. As seen in the drawings, the upper end of post 40 is positioned above the upper ends of frame members 26 and 28. Arms 42 and 44 are pivotally connected to the upper end of the post 40 by pin 46.

Figure 2:
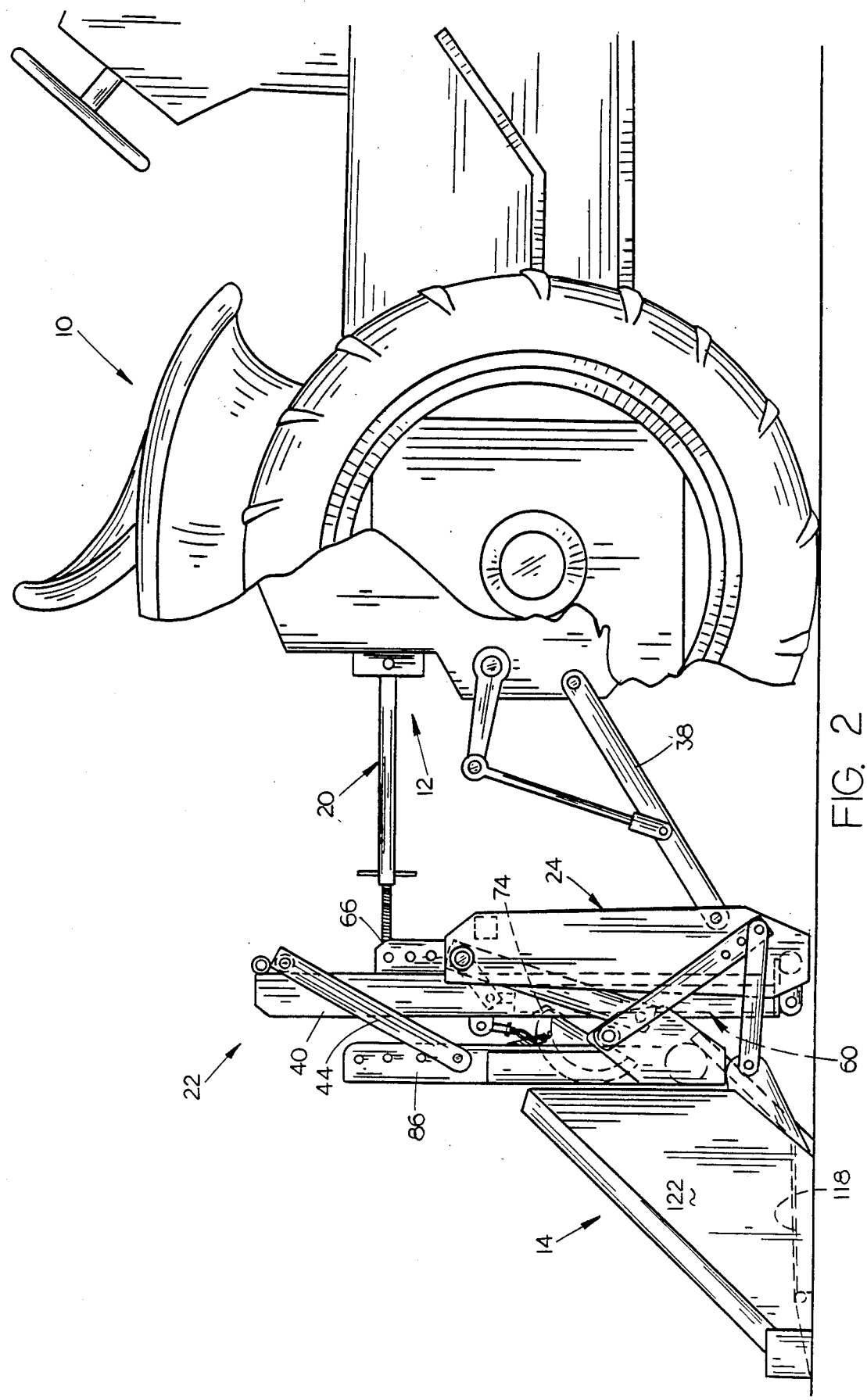
FIG. 2 is a side elevational view of the invention illustrating the bucket in its lowermost position.

Shaft 48 is rotatably mounted on the upper ends of frame members 26 and 28 and extends therebetween as seen in the drawings. Arms 50 and 52 are welded at one end thereof to shaft 48 in a spaced-apart relationship. Brackets 54 and 56 are welded to shaft 48 in a spaced-apart relationship laterally of post 40 and have the rod end 58 of hydraulic cylinder 60 pivotally received therein as seen in FIG. 2. The lower end of hydraulic cylinder 60 is pivotally secured to frame member 30 by pin 62. Bracket 64 is secured to the rearward end of post 40 adjacent the upper end thereof and has the end 66 of upper link arm 20 pivotally connected thereto. As seen in the drawings, rod end 66 is selectively vertically pivotally secured to the bracket 64. The other end of link arm 20 is pivotally connected to the upper link receptacle of the three-point hitch assembly of the tractor.

As seen in FIG. 1, one end of chain 68 is secured to bracket 70 mounted on post 40. The other end of chain 68 is connected to the cam 72 as will be described in more detail hereinafter. As seen in FIG. 2, post 40 is provided with a recess 74 for receiving a portion of the cam 72 at times.

Bucket assembly 14 includes a horizontally disposed support 76 which has brackets 78 and 80 positioned at its opposite ends respectively. Brackets 78 and 80 are pivotally connected to the ends of link arms 50 and 52 by pins 82 and 84 respectively. Upstanding post 86 is secured to support 76 and has a shaft or rod 88 rotatably mounted thereon which extends laterally from both sides thereof. Shaft 88 is rotatably received in brackets 78 and 80 and has lever arms or links 90 and 92 connected to its ends for rotation therewith.

Figure 3:
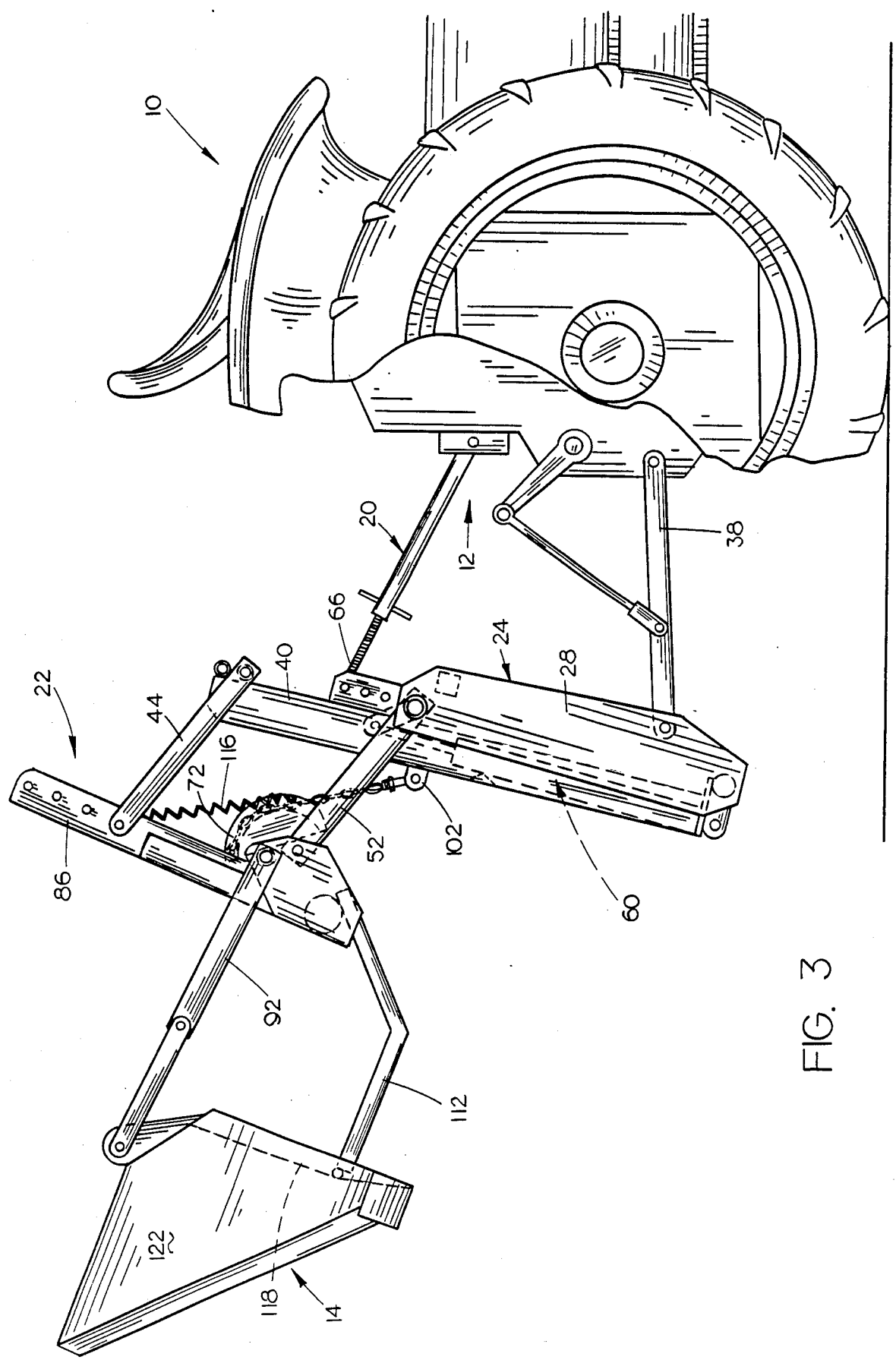
FIG. 3 is a view similar to FIG. 2 except that the bucket has been raised from the ground and moved to its dumping position.

As seen in the drawings, arm 90 has a plurality of openings 94 formed therein while arm 92 has a plurality of openings 96 formed therein. One end of link 98 is pivotally mounted in one of the openings 94 in arm 90 by bolt 100. One end of link 102 is pivotally mounted in one of the openings 96 in arm 92 by bolt 104. The rearward ends of links 98 and 102 are pivotally secured to brackets 106 and 108 on bucket 110 by pins 111 and 113 respectively. The forward end of arm 112 is secured to support 76 by welding or the like. The rearward end of arm 112 is secured to bucket 110 by removable pin 114. Cam 72 is secured to shaft 88 within post 86 for rotation with shaft 88. One end of chain 68 is secured to the upper end of cam 72 as seen in the drawings. The other end of chain 68 is secured to bracket 70 as previously described. Spring 116 is secured at its upper end to post 86 and is secured at its lower end to cam 72 for urging the cam to return to its normal position of FIG. 3. Spring 116 may be replaced by any suitable means which will tend to "kick" the cam off-center.

For purposes of description, bucket 110 will be described as including a bottom portion 118 which is horizontally disposed when the hitch assembly of the tractor is in its lowermost position as illustrated in FIG. 2. Bucket 110 also includes side walls 120 and 122 having back wall portions 124 and 126 extending therebetween. The rearward ends of arms 42 and 44 are selectively vertically pivotally secured to post 86 by means of bolt 128 extending through a pair of the openings 130.

Figure 4:
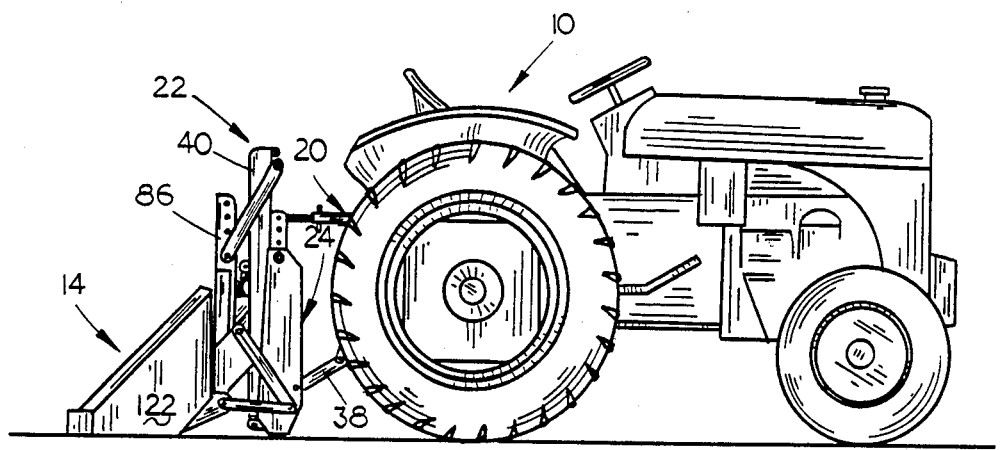
FIGS. 4–8 are side views illustrating the sequence of operation of the attachment.
Figure 5:
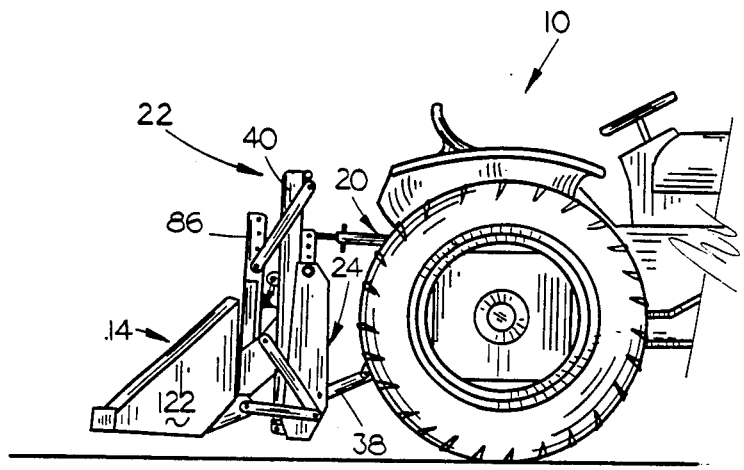
Figure 6:
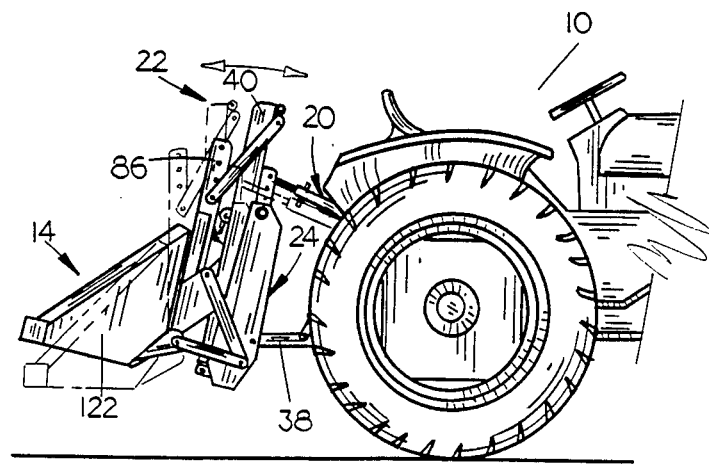
Figure 7:
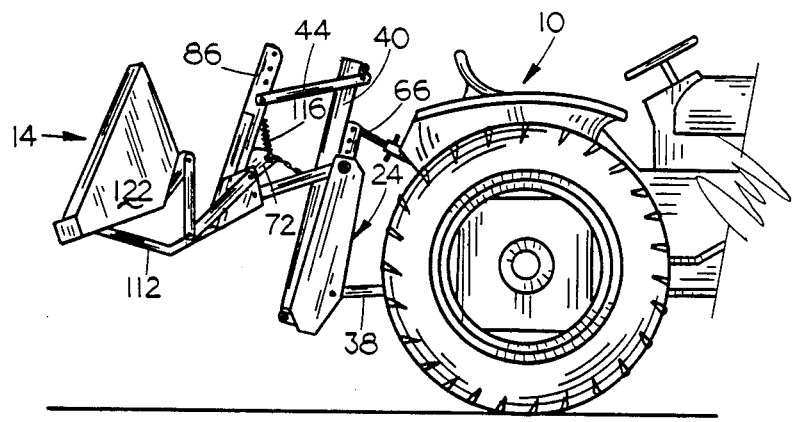
Figure 8:
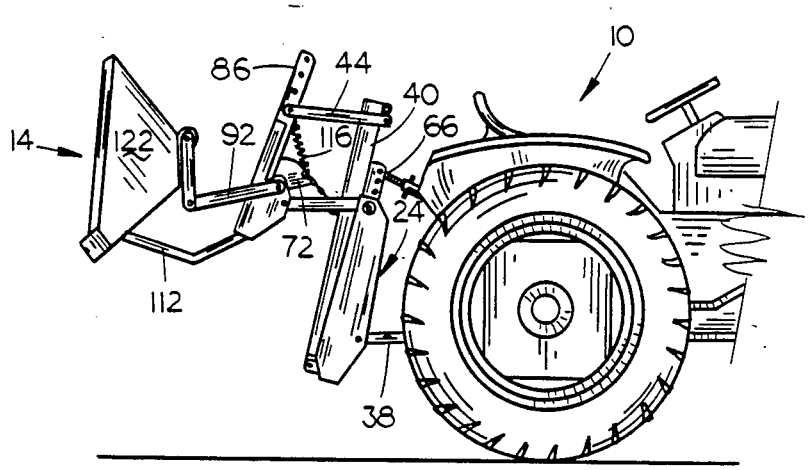

In FIGS. 2 and 4, the bucket 110 is located in its lowermost position as is the three-point hitch assembly 12. When it is desired to move dirt or the like, the bucket 110 may be positioned as in FIG. 4 or any position thereabove such as illustrated in FIGS. 5 or 6. The tractor is backed so that the bucket 110 is filled with the material to be transported. When the bucket has been filled, the bucket would normally be raised somewhat.

The tractor is then driven to the location where the material is to be dumped or deposited. The continued vertical movement of the assembly from the position of FIG. 5 is achieved by vertically moving the three-point hitch assembly 12 and by extending the cylinder 60. Vertical movement of the hitch assembly 12 causes the frame means 24 to be vertically moved. Extension of cylinder 60 causes shaft 48 to be rotated which causes the arms 50 and 52 to be pivotally moved upwardly which causes the bucket assembly 14 to be pivotally moved upwardly relative to the frame means 24. As the bucket assembly 14 is pivotally moved upwardly relative to the frame means 24, chain 68 causes shaft 88 to be rotated which causes the links 90, 98 and 92, 102 to pivotally move the bucket 110 relative to the assembly so that the bucket is moved to the dumping position illustrated in FIG. 9.

Figure 9:
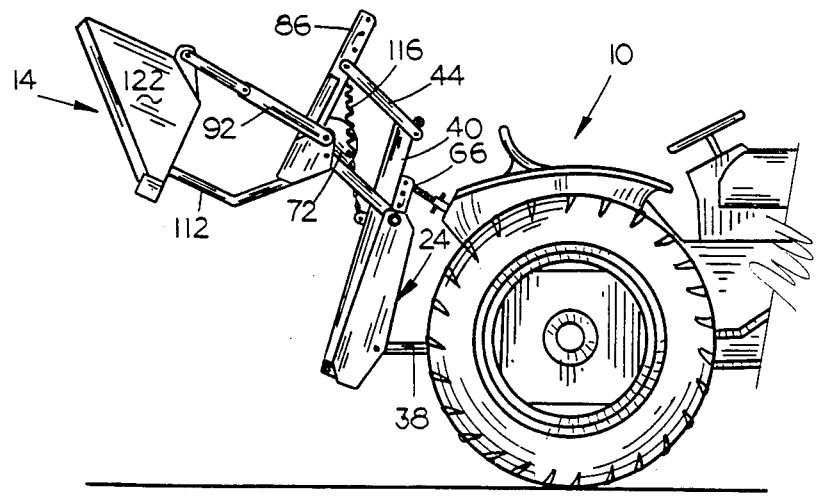

When it is desired to return the apparatus from the position of FIG. 9 to the position of FIG. 2, the three-point hitch assembly 12 is lowered and the hydraulic cylinder 60 is retracted. Retraction of hydraulic cylinder 60 causes the bucket assembly to pivot downwardly relative to frame means 24 so that the various components again assume the relationship as illustrated in FIG. 2.

It can therefore be seen that a novel material handling attachment has been provided for a tractor which includes self-leveling and automatic dumping features. It can also be seen that the apparatus of this invention enables the bucket to be lifted to a higher dumping position than that which would normally be possible. It can therefore be seen that the invention accomplishes at least all of its stated objectives.

We claim:

1. In combination,
  - a tractor having a vertically movable three-point hitch assembly provided thereon, said hitch assembly being vertically movable between a lower position and an upper position,
  - a high-lift mechanism secured to said three-point hitch assembly comprising a frame means having upper and lower ends, a first elongated arm means pivotally secured, at one end, to said frame means adjacent the upper end thereof and extending therefrom, a second elongated arm means pivotally secured, at one end, to said frame means below the pivotal connection of said first arm means and said frame means, means operatively connected to said second arm means for pivotally moving the other end of said second arm means between upper and lower positions,
  - bucket support frame means pivotally secured to the said other ends of said first and second arm means for vertical movement therewith whereby said bucket support frame means may be independently vertically moved relative to said frame means of said high-lift mechanism, said bucket support frame means being vertically movable between upper and lower positions relative to said frame means of said high-lift mechanism,
  - a materials handling bucket pivotally mounted on said bucket support frame means and being movable between working and dumping positions,
  - and linkage means operatively interconnecting said bucket, said bucket support frame means and said high-lift mechanism which positions said bucket in its working position when said bucket support frame means is in its said lower position and which automatically positions said bucket in its dumping position when said bucket support frame means is in its said upper position,
  - said bucket support frame means comprising an elongated horizontally disposed support positioned transversely with respect to the longitudinal axis of the tractor and having opposite ends,
  - an upstanding post means secured at its lower end to said support at the center of said support, said other end of said second arm means being pivotally secured to said support,
  - the said other end of said first arm means being pivotally secured to said upstanding post means adjacent the upper end thereof,
  - said linkage means comprising a horizontally disposed shaft operatively rotatably mounted on said support and being parallel thereto, an actuator means mounted on said shaft to cause the rotation of said shaft,
  - connection means extending between said actuator means and said high-lift mechanism whereby upward movement of said bucket support frame means relative to said high-lift mechanism will cause said shaft to be rotated, by said actuator means in a first direction,
  - first and second arms rigidly secured to the opposite ends of said shaft and extending therefrom, first and second spaced-apart support arms rigidly secured, at one end thereof, to said support and extending therefrom,
  - the other ends of said first and second support arms being pivotally secured to said bucket,
  - first and second elongated links pivotally secured at one end to the said other ends of said first and second arms respectively, the other ends of said links being pivotally secured to said bucket, the relationship of said bucket, links, arms and support arms being such that said bucket will pivotally move to its working position when said bucket support frame means is in its said lower position and will remain so until said bucket support frame means is raised to a predetermined height relative to said high-lift mechanism.

* * * * *